(No Model.)
J. T. HORN.
CULTIVATOR.
No. 600,422. Patented Mar. 8, 1898.
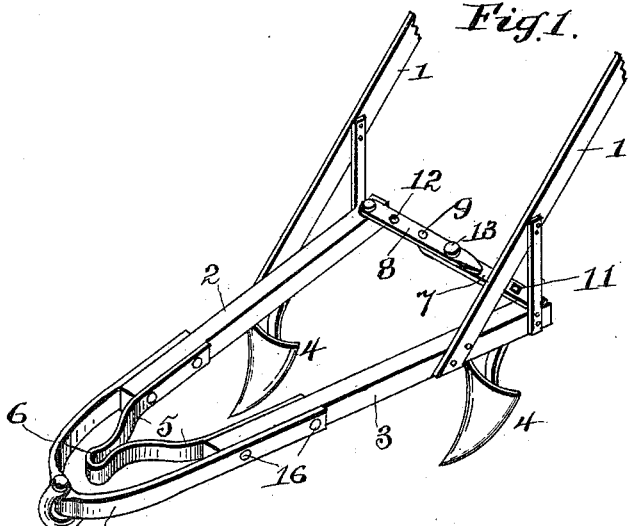
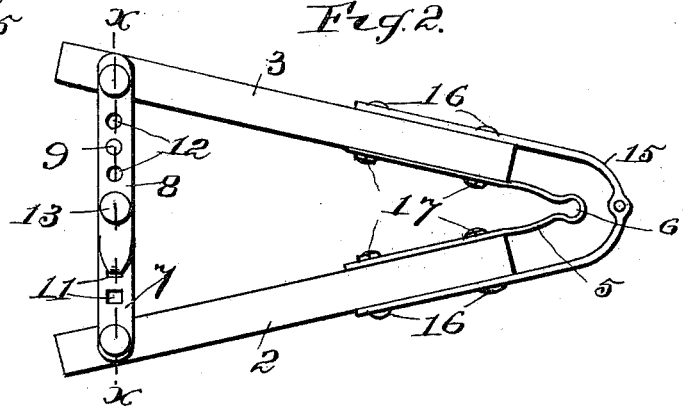
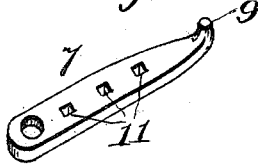
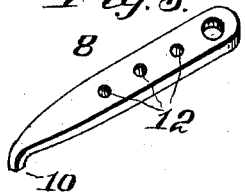
Witnesses.
C. T. Belt
John S. Stump
Inventor.
John T. Horn,
By W. H. Wills,
Attorney.

UNITED STATES PATENT OFFICE.

JOHN T. HORN, OF ARARAT, ALABAMA.

CULTIVATOR.

SPECIFICATION forming part of Letters Patent No. 600,422, dated March 8, 1898.

Application filed September 18, 1897. Serial No. 652,163. (No model.)

*To all whom it may concern:*

Be it known that I, JOHN T. HORN, a citizen of the United States, residing at Ararat, in the county of Choctaw and State of Alabama, have invented certain new and useful Improvements in Cultivators, of which the following is a specification.

This invention relates to plows, and particularly to a plow beam or stock.

The object of the invention is to provide an improved means for varying the width of plow beams or stocks by a plate-spring connection at the forward end of the stock and an adjustable interlocking device at the rear ends of the beam or stock.

The invention consists in the novel construction and arrangement of parts, and resides, essentially, in connecting the forward ends of the plow-stock together only by a plate spring or springs.

In the accompanying drawings, forming part of this application, Figure 1 is a perspective view of my stock applied to a plow. Fig. 2 is a top view of the stock. Fig. 3 is a section on the line x x, Fig. 2. Fig. 4 is a perspective of one arm. Fig. 5 is a perspective of the other arm.

The same numeral references denote the same parts throughout the several figures of the drawings.

The plow-handles 1 are of ordinary construction, one being secured to one arm 2 and the other to the other arm 3 of the stock, from which the plow-points 4 are suspended in the usual manner. The front ends of the stock-arms 2 and 3 are connected together by a plate-spring 5, having a central loop or bend 6, which admits of said arms being sprung in adjusted position toward or from each other, as desired, in order to set the plow-points at various distances apart. The rear ends of the stock-arms are connected together by arms 7 and 8. The free end of the arm 7 has an upwardly-turned projection 9, and the free end of the arm 8 has a downwardly-turned projection 10. The arm 7 has square apertures 11, and the arm 8 has round apertures 12. The projection of one arm engages the apertures of the other arm, said arms being secured together by a bolt 13 and nut 14.

The double or single tree is connected to the stock by means of a flexible bow-plate 15, the ends of which are secured to the front ends of the stock-arms 2 and 3 by bolts 16, passed through the said flexible-plate ends, through the arm ends, and through the plate-spring ends, and held by nuts 17. By this construction the front ends of the stock-arms are connected together only by the spring and flexible plate, which causes the said stock-arms to have an outward pressure against the projections, and should the bolt and nut which holds the perforated arms become loose or displaced the said pressure will hold the said arms temporarily locked together.

It is obvious that in high plow-stocks the elastic plate may be dispensed with and the singletree connected to the loop of the spring. It is also obvious that the stock may be detached and provided with harrow-teeth, the plow-points being removed and the stock being used as a harrow, without departing from my invention.

Having thus described my invention, what I claim as new, and desire to secure by Letters Patent, is—

1. The combination with a cultivator, of a stock comprising two arms, a flexible plate joining the arms together, and the spring-plate within the flexible plate and having its ends secured to the said arms, as set forth.

2. The combination with a cultivator, of the stock-arms, the flexible plate connecting one end of the arms together, a spring-plate within the flexible plate and having its ends secured to the arms, and the perforated arms, one having an upturned end and the other a downwardly-turned end, said arms being attached to the stock-arms to adjust the latter, as set forth.

3. The combination with a cultivator, of the stocks, the plate joining the stocks, the inner plate having a central loop and secured to the stocks to form a spring, and means at the opposite end of the stocks to control the spring, as set forth.

In witness whereof I hereunto set my hand in the presence of two witnesses.

JOHN T. HORN.

Witnesses:
R. P. ROACH,
G. I. GAVIN.